July 10, 1945.  C. SAUZEDDE  2,380,191
SHOCK ABSORBER
Filed Feb. 2, 1942
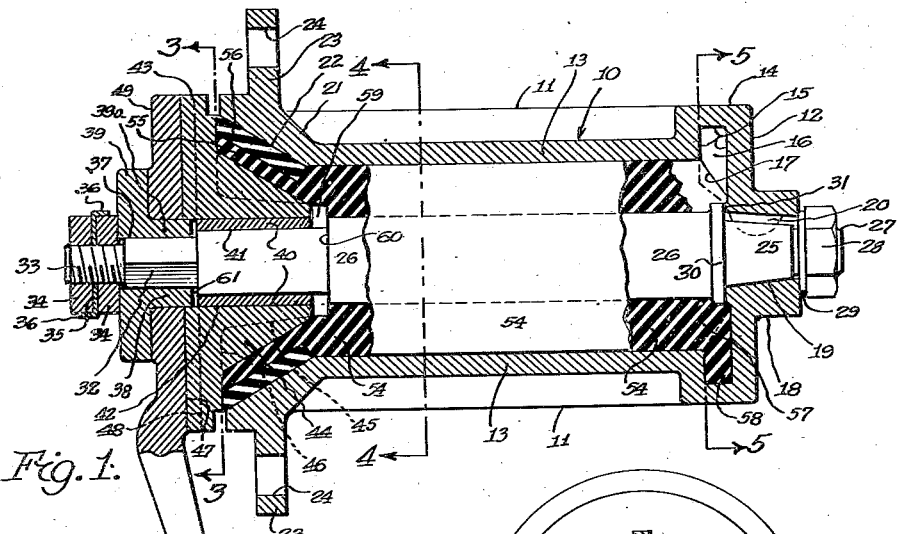
Fig. 1.
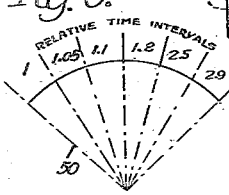
Fig. 6.
Fig. 3.
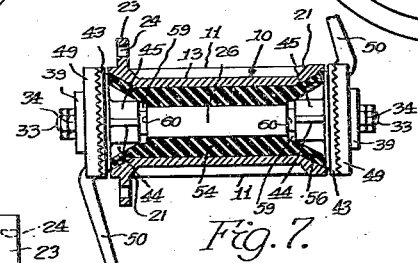
Fig. 2.  Fig. 7.
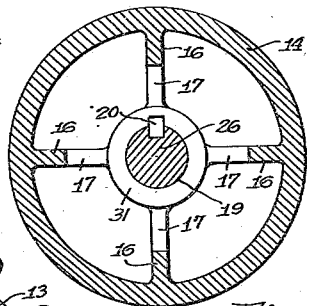
Fig. 5.
Fig. 4.
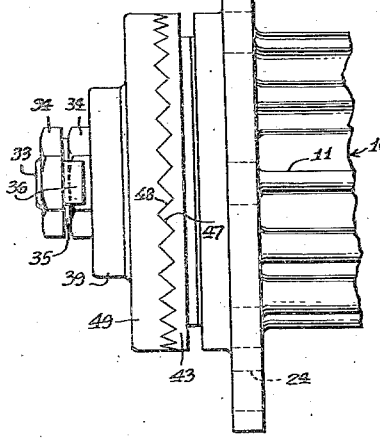
Inventor
Claude Sauzedde
By
Barthel & Bugbee
Attorneys Patented July 10, 1945

2,380,191

UNITED STATES PATENT OFFICE 2,380,191

SHOCK ABSORBER

Claude Sauzedde, Detroit, Mich.

Application February 2, 1942, Serial No. 429,177

18 Claims. (Cl. 267—21)

This invention relates to shock absorbers and, in particular, to shock absorbers with oscillatory action.

One object of this invention is to provide a shock absorber wherein a sleeve of rubber-like material is twisted during the shock absorbing action, thereby impressing a retarding action upon the shock receiving member.

Another object is to provide a shock absorber wherein a sleeve of rubber-like material is twisted in response to the reception of a shock, thereby drawing the conical portion connected thereto into frictional engagement with a corresponding internal conical portion.

Another object is to provide a shock absorber having a hollow hub with an axle surrounded by a sleeve of rubber-like material anchored to the hub at one end and anchored at its other end to an oscillatable member, the sleeve having an external conical friction portion which is pulled into frictional engagement with an internal conical portion of the hub by the twisting of the sleeve, the combined action of the twisting of the rubber-like material and the above frictional engagement producing a damping of the shocks or vibrations.

In the drawing:

Fig. 1 is a central vertical section through a preferred embodiment of the shock absorber of this invention.

Fig. 2 is a top plan view of the left-hand end of the shock absorber shown in Fig. 1.

Fig. 3 is a section along the line 3—3 in Fig. 1.

Fig. 4 is a section along the line 4—4 in Fig. 1.

Fig. 5 is a section along the line 5—5 in Fig. 1.

Fig. 6 is a dagram showing the relative time intervals between successive positions of the operating arm.

Fig. 7 is an elevation, partly in section, of a modification employing braking cones at both ends of the device.

In general, the shock absorber of this invention consists of a hollow hub or outer support having an axle or shaft passing therethrough and surrounded by a sleeve of rubber-like material. One end of this sleeve is anchored to one end of the hub, and the other end of the hub is internally flared or tapered and is engaged by a correspondingly conical portion connected to the sleeve. The latter at this end is anchored to an oscillatory bushing to which is attached an arm for connection to the body or element subjected to vibration. The shock absorber is useful in airplanes, land vehicles, door checking devices and other mechanisms for bringing a swinging or vibrating body to a halt in a smooth and even manner.

Referring to the drawing in detail, Figure 1 shows the shock absorber of this invention as consisting of a hollow cylindrical hub or casing 10 having cooling ribs 11 thereon and having a rear end portion 12 connected to the central portion 13 by means of an outwardly extending annular portion 14 with an internal annular groove 15 provided with radial ribs 16 (Fig. 5). The ribs 16 are provided with inclined forward edges 17 and are spaced apart from one another in order to provide an anchorage for the shock absorbing sleeve as described below.

The end portion 12 is provided with a longitudinally extending portion 18 having a conical bore 19 carrying a key 20. At its opposite end the hub 10 is provided with an outwardly flared portion 21 having an internal conical bore 22 and an attachment flange 23 of annular form having attachment apertures 24 spaced around the periphery thereof.

Secured within the tapered bore 19 and held against rotation by the key 20 is the correspondingly tapered portion 25 of an axle 26 the outer end of which is threaded as at 27 and carries a nut 28 and washer 29 for drawing the portions 19 and 25 together. Beyond the tapered portion 25 the axle 26 is provided with a flange 30 which engages an annular rib 31 projecting inwardly from the longitudinal portion 18.

The outer end of the axle 26 is squared, as at 32, and terminates in a threaded portion 33 carrying a pair of lock nuts 34 with a locking washer 35 therebetween and having turned-down locking tabs 36.

Mounted on the squared portion 32 and having a squared aperture 37 therethrough is a collar 38 having a flange 39 on the outer end thereof. The collar 38 is also provided with a longitudinal portion 39a which abuts a bushing 40 extending around the adjacent portion of the axle 26 and having a bore 41 rotatably receiving the axle 26. The sleeve 40 is pressed into a bore 42 within a rotary member 43 having radial ribs 44 at intervals around the periphery thereof, these ribs 44 extending between the longitudinal portion 45 and the radial portion 46 of the rotary member 43.

The rotary member 43 is provided with longitudinally directed teeth 47 meshing with corresponding teeth 48 upon the hub portion 49 of an arm 50. The latter at its free end is provided with a boss 51 having a transverse bore 52 therein for attachment of suitable other mechanism by which the shocks or vibration are conveyed to the shock absorber, and forming no part of the present invention.

Mounted within the hollow hub 10 is a sleeve 54 of rubber-like material having its inner end bonded or otherwise firmly secured to the inner surface of the hub end 12 and annular surface 15 of the portion 14. The rubber-like material also extends between the ribs 16 and is lodged in the spaces therebetween.

The opposite end of the rubber-like sleeve 54 is likewise bonded to the surfaces of the portions 45 and 46 of the rotary member 43 and likewise extends into the spaces between the ribs 44. This end of the rubber-like sleeve 54 is provided with an outwardly flared portion 55 to which is secured, as by vulcanization, a friction lining 56 of approximately hollow conical shape, and adapted to frictionally engage the internal conical surface 22 upon the flared portion 21 of the hub or casing 10. The inner end 57 of the sleeve 54 has an annular portion 58 which extends into the internal annular groove 15 having the radial ribs 16. The other end of the sleeve 54 has a clearance space 59 adjacent a shaft shoulder 60. A clearance 61 also exists between members 39 and 40. This clearance is for the purpose of providing an adjustment of the braking action, by unbending the tabs 36 and rotating the nuts 34.

In the operation of the shock absorber, the rubber-like material 54 is frequently under initial torsion, particularly when it is used in a vehicle such as an airplane. The weight of the vehicle, transmitted through the arm or connecting lever 50, twists the material 54 to some extent. In other installations, such as in door checking devices, this initial torsion may be absent.

In either case, when a shock or a motion to be absorbed is transmitted to the arm or connecting lever 50, the latter rotates the rotary member 43, twisting the rubber-like material 54 around the axle 26. This occurs because the material 54 is anchored at one end to the end wall 12 of the hub or casing 10 and at its other end to the rotary member 43. As the rubber-like material 54 is twisted, its twisting offers resistance to the rotation of the rotary member 43. At the same time, it asserts a longitudinal pulling upon the friction lining 56, drawing it into frictional engagement with the internal conical surface 22 in the flared end 21 of the casing 10. This frictional inter-engagement between the friction lining 56 and the conical surface 22 provides an additional retarding effect which additionally resists the rotation of the rotary member 43.

As a consequence, the swinging of the arm or connecting lever 50 in response to a shock or a motion to be absorbed immediately sets up resistance in the rubber-like sleeve 54 which absorbs the shock. At the same time the natural cushioning effect of the rubber-like material 54 reduces vibration occurring in connection with the shock. Finally, the braking effect occurring between the conical portions 56 and 22 further dampens the shocks or other oscillations which the device is intended to absorb.

Figure 6 illustrates, in a diagrammatic way, the manner in which the operating arm 50 moves through successive positions at equal angular intervals with constantly increasing time intervals as the rubber-like sleeve 54 is twisted. The numbers beneath the words "relative time intervals" represent successive time units and are purely illustrative of the damping action of the shock absorber and are not absolute nor precise.

Thus, according to this invention, a shock absorber has been provided which is especially adaptable to motor vehicles, aircraft and other commercial and military applications. This shock absorber absorbs the shock through a resilient material, such as rubber or a synthetic or natural material having resilient properties similar to rubber. The use of the rubber-like material avoids the necessity of employing fluids, such as are used in other shock absorbers and the simplicity obtained is decidedly greater than in many other types of shock absorbers. The simplicity of the invention also results in the saving of much weight, which in turn makes it especially valuable in aircraft, and also reduces the manufacturing cost.

The shock absorber of the present invention also has a dual action. One part of this action consists in the resistance set up by the twisting of the rubber-like sleeve 54 itself. The other part of the action consists in the braking effect resulting from the frictional engagement between the friction lining 54 and the internal conical surface 22 in the hub or casing 10 which results when the rubber-like sleeve 54 is twisted.

It will be further understood that coacting disks or disk-like surfaces may be employed as braking elements in place of the conical member 56 and conical surface 22.

The modification shown in Figure 7 is broadly similar in principle to the construction at the left-hand end of the Figure 3. Instead of anchoring the right-hand end of the rubber-like sleeve 54 as in Figure 3, the Figure 7 modification attaches another arm 50, and members 39, 49 and 43 secured thereto. The right-hand member 50, however, is connected to swing in the opposite direction from the left-hand one, so that the rubber-like sleeve 54 will be twisted in opposite directions at its opposite ends when oscillations or shocks are transmitted to the arms 50. As there are conical portions 56 and 22 at both ends of the Figure 7 modification, there is a braking action at both ends. Moreover, the construction in Figure 7 distributes the braking load between the opposite ends of the hub or casing 10, increasing the efficiency of the shock absorber. The parts at the right-hand end of Figure 7 correspond to those at the left-hand end thereof, hence are given corresponding reference numerals.

While a specific embodiment of the invention has been described and illustrated, it will be understood that various modifications may be made within the scope of the appended claims without departing from the spirit of the invention.

It will be further understood that this invention may also be used as a suspension in place of springs on a vehicle and other spring supported body, such as upon an automobile or upon a gun carriage to absorb recoil.

What I claim is:

1. In a shock absorber, an elongated hollow casing having an annular recess at one end thereof, an elongated tubular body of rubber-like material secured near one end to said casing within said recess, a shaft secured to said casing and extending concentric therewith, a rotary operating member rotatably mounted on said shaft and secured to said rubber-like body near the other end thereof and operable to torsionally twist said body about said shaft, and means responsive to the twisting of said rubber-like body for braking the motion of said operating member.

2. In a shock absorber, an elongated hollow casing having an annular recess at one end thereof, an elongated tubular body of rubber-like material secured near one end to said casing within said annular recess, a shaft secured to said casing and extending concentric therewith, a rotary operating member rotatably mounted on said shaft and secured to said rubber-like body near the other end thereof and operable to torsionally twist said body about said shaft, a brake portion connected to said casing, said tubular rubber-like body extending between said brake portion and rotary operating member and means on said extended portion responsive to the twisting of said rubber-like body for frictionally engaging said brake portion.

3. In a shock absorber, an elongated hollow casing having an annular recess at one end thereof, an elongated tubular body of rubber-like material secured near one end to said casing within said recess, a rotary operating member secured to said rubber-like body near the other end thereof and operable to torsionally to twist said body, a brake portion connected to said casing, a braking member connected to said rubber-like body, said tubular body projecting between the brake portion and rotary operating member and responsive to the twisting of said rubber-like body for contracting the same and bringing said braking member into frictional engagement with said braking surface.

4. In a shock absorber, an elongated hollow casing having an annular recess at one end thereof, an elongated tubular body of rubber-like material secured near one end to said casing within said recess, a rotary operating member secured to said rubber-like body near the other end thereof and operable to torsionally twist said body, a brake portion connected to said casing, and a braking member connected to said rubber-like body near the end thereof remote from the end secured to said casing said tubular body extending between said brake portion and said rotary operating member.

5. In a shock absorber, an elongated hollow casing, an elongated body of rubber-like material secured near one end to said casing, a rotary operating member secured to said rubber-like body near the other end thereof and operable to torsionally twist said body, a flared braking portion connected to said casing, and a flared braking member connected to said rubber-like body adjacent said braking portion and engageable therewith the movable end of said body extending between the brake portion and rotary operating member.

6. In a shock absorber, an elongated hollow casing having an annular recess at one end thereof, an elongated body of rubber-like material secured near one end to said casing with the end thereof received and fastened in said recess, a rotary operating member secured to said rubber-like body near the other end thereof and operable to torsionally twist said body, and a pair of mutually engageable braking elements disposed between and connected respectively to said casing and said rubber-like body with said rubber-like body extending between said rotary operating member and braking elements.

7. In a shock absorber, an elongated hollow casing, an elongated body of rubber-like material secured near one end to said casing, a rotary operating member secured to said rubber-like body near the other end thereof and operable to torsionally twist said body, and mutually engageable conical braking surfaces disposed between and connected respectively to said casing and said rubber-like body with said rubber-like body having its movable end extending between the rotary operating member and braking elements.

8. In a shock absorber, an elongated hollow casing, an axle extending therethrough and connected thereto, an elongated sleeve of rubber-like material mounted on said axle and secured to one end of said casing, and a rotary operating member secured to the other end of said sleeve and rotatably mounted upon said axle for twisting said sleeve about said axle whereby contraction of said sleeve will cause the same to frictionally engage said axle.

9. In a shock absorber, an elongated hollow casing having an annular recess at one end thereof, an axle extending therethrough and connected thereto, an elongated sleeve of rubber-like material mounted on said axle and secured to one end of said casing within said recess, a rotary operating member secured to the other end of said sleeve and rotatably mounted upon said axle for torsionally twisting said sleeve about said axle, and a pair of mutually engageable braking surfaces disposed between and connected respectively to said casing and said sleeve. With the rubber-like body extending between said rotary operating member and said braking elements.

10. In a shock absorber, an elongated hollow casing having an annular recess at one end thereof, an axle extending concentrically therethrough and connected thereto, an elongated sleeve of rubber-like material freely mounted on said axle and secured to one end of said casing with its end received in said recess, a rotary operating member secured to the other end of said sleeve and rotatably mounted upon said axle for twisting said sleeve about said axle, and mutually engageable frusto-conical braking elements disposed between and connected respectively to said casing and said sleeve said sleeve having its free movable end sandwiched between the rotary operating member and braking elements.

11. In a shock absorber, a casing, an elongated tubular body of rubber-like material within said casing, swingable operating members secured to the opposite ends of said body and swingable in opposite directions to torsionally twist said body and move said operating members inwardly toward said casing, and brake surfaces at each end of the casing frictionally engageable by the ends of said tubular body of rubber-like material.

12. In a shock absorber, a casing, a body of rubber-like material within said casing, swingable operating members secured to the opposite ends of said body and swingable in opposite directions to twist said body and move said operating members inwardly toward said casing, brake portions connected to said casing at its opposite ends, and braking members engageable with said brake portions and secured to said rubber-like body at its opposite ends whereby torsional twisting of said rubber-like body material will cause the frictional engagement of said braking portion and braking members.

13. In a shock absorber, an elongated hollow casing, having brake portions at its opposite ends, an axle extending therethrough, an elongated sleeve of rubber-like material mounted on said axle and having brake members at its opposite ends engageable with said brake portions, and oppositely swingable operating members rotatably mounted on the ends of said axle and secured to the opposite ends of said body whereby torsional twisting of said elongated sleeve will cause frictional engagement of said brake portions and brake members.

14. In a shock absorber, an elongated hollow casing, having brake portions at its opposite ends, an axle extending therethrough, an elongated sleeve of rubber-like material mounted on said axle and having brake members at its opposite ends engageable with said brake portions, and oppositely swingable operating members secured to the opposite ends of said body and oscillatable to and fro on said axle whereby torsional twisting of said body will contract the same and cause said brake portions to be frictionally engaged by said brake members.

15. In a shock absorber, a casing, a tubular body of rubber-like material having a portion thereof secured to said casing and an outwardly flared end portion, a shaft connected to said casing, an oscillatory operating member secured to said shaft and fastened to said end portion of said tubular body at a location remote from the portion thereof secured to said casing and operable to torsionally twist said body about said shaft, and a brake element interposed between said casing and flared end of said tubular body member responsive to the twisting of said rubber-like body for braking the motion of said operating member about said shaft, whereby oscillatory motion of said operating member will cause the outwardly flared end of the tubular body member to be moved into frictional engagement with the casing.

16. In a shock absorber, a casing, a tubular body of rubber-like material having a portion thereof secured to said casing and an outwardly flared end portion, a shaft connecting said casing, an oscillatory operating member mounted on said shaft and secured to the outwardly flared end portion of said body and operable to torsionally twist said body about said shaft, said oscillatory operating member being secured to said rubber-like body at a location remote from the portion thereof secured to said casing whereby oscillatory motion of said operating member will cause the outwardly flared end of the tubular body member to be moved into frictional engagement with the casing.

17. In a shock absorber, an elongated hollow casing having an annular recess in one end thereof, an elongated tubular body of rubber-like material secured to said casing within said recess, said tubular body having an outwardly flared end portion, a shaft connecting said casing and concentric with said recess, and a rotary operating member on said shaft secured to said rubber-like body near the outwardly flared end thereof and operable upon oscillation about its axis to torsionally twist said body about said shaft whereby oscillatory motion of said operating member will cause the outwardly flared end of the tubular body member to be moved into frictional engagement with the casing.

18. In a shock absorber, a casing, a body of rubber-like material within said casing, swingable operating members secured to the opposite ends of said body and swingable in opposite directions to twist said body and move said operating members inwardly toward said casing, and brake elements carried by the casing and tubular body at each end thereof responsive to the twisting of said rubber-like body for braking the motion of said operating members.

CLAUDE SAUZEDDE.